United States Patent [19]

Muggee et al.

[11] Patent Number: 4,945,006
[45] Date of Patent: Jul. 31, 1990

[54] LOW ODOR ADHESIVE COMPOSITIONS AND BONDING METHOD EMPLOYING SAME

[75] Inventors: John M. Muggee, Stillwater; Eric L. Zilley, St. Paul, both of Minn.

[73] Assignee: Minnesota Mining and Manufacturing Company, St. Paul, Minn.

[21] Appl. No.: 297,873

[22] Filed: Jan. 17, 1989

[51] Int. Cl.$^5$ .............................................. B32B 27/00
[52] U.S. Cl. ................... 428/500; 156/307.5; 156/310; 156/314; 156/331.1; 156/331.5; 206/568; 525/55; 526/135; 526/263; 526/305; 526/307.6
[58] Field of Search ...................... 156/310, 314, 307.5, 156/331.1, 331.5; 526/135, 305, 263, 307.6; 206/568; 525/55; 428/500

[56] References Cited

U.S. PATENT DOCUMENTS

| | | |
|---|---|---|
| 2,658,056 | 11/1953 | Ham . |
| 2,773,063 | 12/1956 | Specht . |
| 2,831,833 | 4/1958 | Aycock et al. ...................... 526/263 |
| 3,591,438 | 7/1971 | Toback et al. . |
| 3,616,040 | 10/1971 | Toback et al. . |
| 3,658,624 | 4/1972 | Lees . |
| 3,876,594 | 4/1975 | Lim et al. . |
| 3,890,407 | 6/1975 | Briggs, Jr. et al. . |
| 3,994,764 | 11/1976 | Wolinski . |
| 4,062,831 | 12/1977 | Kopecek et al. . |
| 4,106,971 | 8/1978 | Briggs, Jr. et al. . |
| 4,112,013 | 9/1978 | Briggs, Jr. et al. . |
| 4,126,504 | 11/1978 | Wolinski et al. . |
| 4,138,449 | 2/1979 | Baldwin et al. . |
| 4,239,113 | 12/1980 | Gross et al. ......................... 206/568 |
| 4,308,014 | 12/1981 | Kawahara et al. . |
| 4,322,504 | 3/1982 | Wagner et al. . |
| 4,393,237 | 7/1983 | Yeakey et al. . |
| 4,452,955 | 6/1984 | Boeder . |
| 4,718,899 | 1/1988 | Itoh et al. . |

FOREIGN PATENT DOCUMENTS

| | | |
|---|---|---|
| 087304 | 2/1988 | European Pat. Off. . |
| 728353 | 4/1955 | United Kingdom ................ 526/305 |
| 914780 | 1/1963 | United Kingdom . |
| 2103216A | 2/1983 | United Kingdom . |

OTHER PUBLICATIONS

Chemical Abstracts Service, Registry Handbook, Number Section, 1965–1971, Registry Nos. 4600–00-4 through 12699–98-8 and 26500–00-5 through 30299-9-9-1, pp. designated 26833–80-7 and 1044–37-5.
Chemical Abstracts, Eleventh Collective Index, vols. 96–105, 1982–1986, page designated "Piperidine, 1-(-1-oxo-2-propenyl)-".

Primary Examiner—John J. Gallagher
Attorney, Agent, or Firm—Donald M. Sell; Walter N. Kirn; Lorraine R. Sherman

[57] ABSTRACT

A novel, fast-bonding adhesive composition is disclosed having low odor, and when cured, forms adhesive bonds having high glass transition temperature, $T_g$, and high shear strength at elevated temperatures. The composition comprises one or more of acryl- and methacrylamides which have a cyclic group directly attached to the amide nitrogen or has the amide nitrogen as a member of a cyclic group. The composition further comprises a polymeric toughener that is dissolved or dispersed in the composition.

20 Claims, No Drawings

LOW ODOR ADHESIVE COMPOSITIONS AND BONDING METHOD EMPLOYING SAME

FIELD OF THE INVENTION

This invention relates to fast-bonding, low-odor adhesive compositions based on substituted acrylamides or methacrylamides and a polymeric toughener. In another aspect, it relates to a process for bonding substrates together using the adhesive compositions. In a further aspect it relates to substrates bonded together by the adhesive compositions of the invention.

BACKGROUND OF THE INVENTION

Second generation acrylic adhesives (SGA's) which are acrylic-based adhesives containing polymeric tougheners are known in the art. U.S. Pat. Nos. 3,890,407; 4,106,971; and 4,112,013 disclose adhesive systems composed of solutions of chlorosulfonated polyethylene or mixtures of sulfonyl chlorides and chlorinated polymers in polymerizable vinyl (preferably acrylic) monomers which cure to high bond strengths. U.S. Pat. No. 3,994,764 discloses an SGA system derived from a solution of a thermoplastic, nonreactive polyester- or polyether-based polyurethane resin in an addition polymerizable combination of an acrylic or methacrylic monomer and a copolymerizable monomer containing at least one free carboxylic acid group. U.S. Pat. No. 4,126,504 discloses the use of a thermoplastic nonreactive elastomer (typically based on at least one of butadiene, neoprene, and their derivatives) dissolved in an addition polymerizable combination of an acrylic or methacrylic monomer and a copolymerizable monomer containing at least one free carboxylic group to give a second generation acrylic adhesive. U.S. Pat. No. 4,138,449 discloses an SGA comprising a butadiene/acrylonitrile rubber having an acrylate end group dissolved in an acrylic, methacrylic, or dimethacrylic ester monomer.

European Patent Application No. 87,304 discloses non-aqueous compositions useful as, or in, low odor adhesives comprised of a sequential polymer (frequently designated as a core/shell polymer), of at least 25% by weight of an elastomeric stage and 5% by weight of an outermost rigid stage, dispersed (not dissolved) in an acrylic or methacrylic ester monomer, including blends of such monomers. These monomers (e.g. acryloyloxypropionic acid) have a flash point greater than 95° C., and form a polymer whose glass transition temperature ($T_g$) falls within the range of 0° to 100° C.

The cited art suffers from one or more of the following deficiencies: first, the common use of lower molecular weight monomers (i.e., lower esters of acrylic and methacrylic acid, e.g. methyl methacrylate) results in a noxious odor problem, often in conjunction with undesirable flammability and toxicity characteristics; second, the use of higher molecular weight monomers to avoid odor, flammability, and toxicity problems can have other effects. For example, the higher molecular weight monomer may become a solid, leading to formulation difficulties. Also, the $T_g$ of a polymer usually decreases as the molecular weight of the monomer increases, resulting in a loss of performance characteristics in the adhesives. In addition, the higher molecular weight monomers may not be suitable for dissolving the polymeric tougheners.

U.S. Pat. Nos. 4,322,504; 4,308,014; 4,393,237; and 3,658,624 disclose the use of substituted acrylamides and methacrylamides, with and without other functional groups present in the substituents, for use in resin binders, medical and dental bonding agents, and untoughened adhesives.

U.S. Pat. No. 2,658,056 discloses a method of making cyclic amines by the reaction of acrylyl chloride and methacrylyl chloride.

U.S. Pat. No. 4,718,899 discloses water-insolubilized products of N-alkyl- or N-alkylene-substituted (metha)acrylamides used for absorbing and releasing urine.

U.S. Pat. No. 3,876,594 discloses copolymers containing N-acryloyl-morpholine, -piperidine, or -pyrolidine used for filling postoperative cavities.

U.S. Pat. No. 4,062,831 discloses N-acrylomorpholine and N-acryloyl piperidine as possible components in the preparation of polymers for use as membrane and as packing for chromatography columns.

Of the above cited art, only U.S. Pat. Nos. 3,994,764 and 4,126,504 broadly disclose N-substituted acrylamides as potential vinyl monomers, although none are exemplified by the patentees. These two patents, in addition, use tougheners which are soluble and nonreactive with respect to the acrylic monomers.

SUMMARY OF THE INVENTION

None of the above mentioned art discloses the use of low odor N-cyclic group-substituted acrylamide or methacrylamide monomers in combination with tougheners, the tougheners preferably being insoluble but dispersable in the substituted monomers, to obtain low odor anaerobic adhesives with properties comparable to those of the currently available high performance/high odor type anaerobic adhesives.

Briefly, the present invention provides a fast bonding adhesive composition which can be formulated either as a one or two part system and comprises (a) one or more cyclic group-containing acrylamido compounds, selected from acrylamides and methacrylamides that have a cyclic group attached directly to the amide nitrogen, and acrylamides and methacrylamides in which the amide nitrogen is a member of a cyclic group;

(b) at least one ethylenically-unsaturated acid that is copolymerizable with (a);

(c) an effective amount of a polymeric toughener; and (d) at least one of an initiator and activator.

Preferably, the ethylenically-unsaturated acid is present in an amount of 0.01 to 1.25 parts by weight per part of acrylamido compound.

The composition is useful as a layer on a variety of substrates and it possesses low odor, and when cured forms adhesive bonds having a high glass transition temperature, $T_g$, and high shear strength at elevated temperatures.

In a preferred embodiment, the composition contains 0.1 to 1.25 parts by weight of the polymeric toughener comprising one or more of (1) core/shell materials and (2) elastomeric polymers that have a $T_g$ of 30° C. or lower and are soluble or dispersable in the acrylamido compound.

As used in the present application:

The term "acrylamido" means compounds (monomers, oligomers, and polymers) of substituted acrylamides and substituted methacrylamides. Hereinafter, the specific nature of the substituents is described in detail; "core shell" refers to a particle having a diameter of about 0.1 to 10 micrometers in an unswollen state and has an elastomeric center and a glassy shell. These particles are well known and are used to improve the impact resistance of polymers;

"low odor" means monomers having less odor than methyl methacrylate monomer as determined by ASTM D 4339-84.

"dispersable" means that the toughener swells, but does not dissolve in the uncured cyclic group-containing acrylamido composition.

"soluble" means in the range of 0.1 to 1.25 parts by weight of the toughener dissolves in one part of the uncured cyclic group-containing acrylamido composition.

DETAILED DESCRIPTION OF THE INVENTION

The present invention provides a fast-bonding, low odor adhesive composition prepared by mixing in any order: one part of one or more copolymerizable N-cyclic group-substituted acrylamides and/or methacrylamides, 0.01 to 1.25 parts by weight (preferably 0.1 to 0.2 parts by weight) of one or more ethylenically-unsaturated carboxylic and/or phosphoric acids copolymerizable with acrylamides and methacrylamides; 0.1 to 1.25 parts by weight (preferably 0.2 to 0.5 parts by weight) of one or more polymeric tougheners; and up to about one part by weight of one or more volatile solvents when necessary to form a solution or dispersion of the composition.

Cyclic group-containing acrylamido compounds that can be used in the preferred embodiment of the invention have the general formula $$H_2C=C(X)-C(=O)-N(R^1)(R^2)$$

wherein

X is hydrogen, methyl, or halogen; preferably X is hydrogen or methyl;

$R^1$ is a mono or polycyclic monovalent group, the cyclic groups of which are selected from (a) aromatic carbocyclic and heterocyclic (i.e., containing atoms such as N, O, S, P, and Si) groups having 5 to 18 atoms in the cyclic group and (b) saturated and unsaturated aliphatic carbocyclic and heterocyclic (i.e., containing atoms such as N, O, S, P, and Si) groups having 4 to 18 atoms in the cyclic group, $R^1$ being optionally substituted by groups selected from lower alkyl groups of 1 to 4 carbon atoms, hydroxyl, acyloxy, alkoxy of 1 to 4 carbon atoms, cyano, halo, phenyl, and benzo groups;

$R^2$ is selected from $R^1$, hydrogen and lower alkyl groups having 1 to 4 carbon atoms or $R^2$ together with $R^1$ is a divalent group, which together with the nitrogen atom to which they are attached form a heterocyclic group having 5 or 6 atoms in the ring that can be substituted by lower alkyl groups of 1 to 4 carbon atoms, hydroxy, acyloxy, alkoxy of 1 to 4 carbon atoms, cyano, halo, or phenyl group or a divalent group that forms a di- or tricyclic group having 12 to 18 atoms in the rings, with the proviso that when X is methyl, $R^2$ is hydrogen.

Examples of acryl- and methacrylamides, which are commercially available or can be made by methods well-known in the art, that can be used in the adhesive composition of the invention include:

N-(piperidyl)acrylamide, also known as N-acryloylpiperidine (this compound is named 1-(1-oxo-2-propenyl)piperidine by Chemical Abstracts), N-(4-chloropiperidyl)acrylamide, N-(1,2-dihydroquinoline)acrylamide, N-(morpholyl)acrylamide, N-(2,6-dimethylmorpholyl)acrylamide, N-(thiomorpholyl)acrylamide, N-(pyrrolidyl)acrylamide, N-(4-phenylphenyl)acrylamide, N-(4-hydroxyphenyl)acrylamide, N-(3-methoxyphenyl)acrylamide, N-(4-cyanophenyl)acrylamide, N-(cyclohexyl)acrylamide, N-(cyclopentyl)acrylamide, N-(norbornyl)acrylamide (also named N-(bicyclo[2.2.1]hept-2-yl)acrylamide), N-(isobornyl)acrylamide, N-methyl-N-phenylacrylamide, N-cyclohexyl-N-methylacrylamide, N-n-butyl-N-cyclohexylacrylamide, N-(naphthalenyl)acrylamide, N-(4-acetylphenyl)acrylamide, N-(2-pyridinyl)acrylamide, N-(2-furanylmethyl)acrylamide, N,N-(dicyclohexyl)acrylamide, N-(phenyl)methacrylamide, N-(norbornyl)methacrylamide, N-(phenyl)acrylamide, N-(cyclohexyl)methacrylamide, and N-(isobornyl)methacrylamide.

The preferred acrylamido compounds are N-(piperidyl)acrylamide, N-(morpholyl)acrylamide, N-(2,6-dimethylmorpholyl)acrylamide, and N-cyclohexyl-N-methylacrylamide. Generally, the glass transition temperatures of acryl- and methacrylamides that are useful for the invention are in the range of 125°-200° C.

THE POLYMERIC TOUGHENER

The polymeric tougheners that may be employed can be divided into two main classes: reactive and nonreactive. These two categories of reactive and nonreactive tougheners may be further subdivided as either soluble or dispersable in the acrylic monomer. These classes of polymeric tougheners are well-known in the art and are commercially available. An example of a reactive toughener would be a toughener having polymerizable ethylenic-unsaturation. The amount of toughener used is determined by the desired effect upon the performance and properties of the resultant adhesive composition. Such considerations include the desired application, the desired viscosity, and other requirements peculiar to a given end use.

Examples of reactive, soluble tougheners are elastomeric polymers generally having a $T_g$ below about 30° C. such as the polyurethanes, polyesters, and polyethers capped with acrylate, methacrylate, acrylamide, or methacrylamide functionalities, which dissolve in the adhesive mixture. Suitable elastomeric polymers generally have a molecular weight of about 1,000 to 100,000, preferably 5,000 to 15,000.

Examples of nonreactive, soluble polymeric tougheners are soluble elastomeric polymers including the polymers derived from 1,3-diolefins such as 1,3-butadiene, isoprene, 2,3-dimethyl-1,3-butadiene, and the like and the copolymers of these monomers with 5 to 40% by weight of a modifying comonomer such as styrene, acrylonitrile, methyl methacrylate and the like. Natural rubber can also be used. Other examples of nonreactive, soluble polymeric tougheners are disclosed in U.S. Pat. No. 4,126,504.

Examples of reactive, dispersable tougheners are core/shell materials comprised of a crosslinked acrylic elastomeric core and a glassy acrylic-functionalized shell, that disperse rather than dissolve in the adhesive mixture. Such core/shell materials are disclosed in U.S. Pat. Nos. 3,649,337; 3,660,371; 3,689,307; 3,689,308; 3,689,309; 3,697,312; 3,701,679; 3,719,521; 3,719,522 and 3,719,523 which are incorporated herein by reference. Polymers of butyl acrylate or styrene/butadiene which contain low levels of cross-linking and are functionalized by capping with acrylates, methacrylates, acrylamides, or methacrylamides are also examples of reactive, dispersable tougheners.

The nonreactive dispersable tougheners are based on either crosslinked elastomeric polymers or core/shell materials. Nonfunctionalized, lightly crosslinked acrylic or styrene/butadiene rubbers are examples of the former. Core/shell materials such as those described in European Patent Application No. 87,304 are examples of the latter. In these materials the core is derived from a crosslinked acrylic or butadiene-based elastomeric polymer and is graft-linked to a thermoplastic shell (e.g. poly(methyl methacrylate)), which does not contain any activated double bonds. The particular additive selected, and the concentration level used in the formulation will depend upon the desired end use and processing criteria.

THE ETHYLENICALLY-UNSATURATED ACID

Ethylenically-unsaturated acids which can be used in the adhesive composition of the invention are any such compounds that in water have a pH of 5.0 or less and are soluble in and copolymerizable by free radical initiated polymerization with the acrylamide compounds described above. Preferably, the ethylenically-unsaturated acids are ethylenically-unsaturated carboxylic acids and ethylenically-unsaturated acids of phosphorus. Examples of preferred acids include acrylic acid, methacrylic acid, itaconic acid, maleic acid; half esters of dicarboxylic acids such as oxalic acid, succinic acid, adipic acid, terephthalic acid, maleic acid, and itaconic acid; and the ethylenically-unsaturated phosphinous, phosphonous, phosphinic, phosphonic, and phosphoric acids such as divinylphosphinous acid [$(H_2C=CH)_2POH$], 2-propenyl phosphonous acid [$H_2C=CHCH_2P(OH)_2$], di-(2-propenyl)phosphinic acid [$(H_2C=CHCH_2)_2P(O)OH$], 2-acryloyloxyethyl-phosphonic acid [$H_2C=CHC(O)OCH_2CH_2P(O)(OH)_2$], 2-methacryloyloxyethylphosphonic acid [$H_2C=C(CH_3)C(O)OCH_2CH_2P(O)(OH)_2$], 2-methacryloxyethyl phosphoric acid [$H_2C=C(CH_3)C(O)OCH_2CH_2OP(O)(OH)_2$] and the like.

THE SOLVENT

It is preferable that no solvent be used in the adhesive composition of the invention. However, by including inert organic solvents, the use of substituted acrylamides or methacrylamides that have a melting point of above 30° C. can be facilitated in the adhesive composition. Preferably, the solvent has a boiling point at atmospheric pressure of less than about 200° C., preferably 50° to 100° C., so that the solvent can be readily volatilized from a coating of the composition. Examples of useful solvents include methanol, ethanol, isopropanol, 2-methoxyethanol, acetone, methylethylketone, tetrahydrofurane, and the like.

THE INITIATOR/ACTIVATOR

To achieve fast curing, both an initiator and an activator are generally required. When a two-part system is formulated, one part will contain an initiator and the other part an activator.

The adhesive compositions of the invention can be cured by an initiator that generates free radicals and is well known and frequently described in the polymerization art. They include: peroxy compounds, i.e. organic peroxides, hydroperoxides, peracids, and peresters; and azo compounds, i.e. azobis(isobutyronitrile) (AIBN). Included among these free-radical initiators are the conventional heat-activated compounds, i.e. benzoyl peroxide, tertiary-butyl perbenzoate, cumene hydroperoxide and AIBN.

It is preferred that the adhesive compositions of the present invention be storage stable and cure at room temperature. Consequently, they are formulated as two-part systems. The first part (A) contains the initiators described above. The second part (B) contains an activator which upon mixing with the initiator contained in part A enters into an oxidation-reduction reaction with the initiator to generate the free radicals that cure the adhesive.

Activators that can be used consist of tertiary amines, amine/aldehyde (or ketone) condensates, mercapto compounds, or transition metal compounds. Examples of useful tertiary amines are: N,N-dimethylaniline, N,N-diethylaniline, N,N-dimethyl-p-toluidine, N,N-diethyl-p-toluidine, or N,N-diisopropyl-p-toluidine. Examples of mercapto compounds are: 2-mercaptobenzimidazole, allylthiourea, and ethylene thiourea. Examples of useful amine/aldehyde condensates are: aniline/butyraldehyde, butylamine/benzaldehyde, and butylamine/benzil. Examples of transition metal compounds are: copper naphthenate, iron naphthenate; cobalt naphthenate, nickel naphthenate, manganese naphthenate; copper octanoate; iron hexanonate, iron propionate; copper oxide, manganese oxide, vanadium oxide, molybdenum dioxide; and vanadium oxide (acetylacetonate)$_2$, and molybdenum oxide (acetylacetonate)$_2$.

The preferred activator for the present invention is the condensation product of an alpha-hydroxy ketone and a primary amine in combination with a salt containing one or more transition metals selected from the group consisting of vanadium, molybdenum, cobalt, iron, and copper as described in detail in applicants co-pending application Ser. No. 07/297,886.

Various adjuvants can be added to the adhesive composition to alter or even improve the characteristics of cured or uncured adhesive composition. These are known in the art and include viscosity modifiers, stabilizers, fillers, pigments, dyes, fibers, glass or plastic microbeads or bubbles, plasticizers, antioxidants, etc., or components which provide enhanced properties at elevated temperatures such as epoxies and maleimides. Depending on the desired function of the additive, from traces to 100% or more by weight of the additive may be used in the composition.

The adhesive compositions of the present invention can be formulated using a primer system wherein the primer consists of a volatile liquid carrier medium containing the activator component of the initiator system. The solution or dispersion of the activator then can be applied by brushing, spraying, dipping, or the like upon at least one of the surfaces to be bonded, and the solvent allowed to evaporate leaving a deposit of the activator on the surface.

The amount of activator to be applied to a given surface should be no more than necessary to obtain efficient acceleration of the bonding operation. Excess activator on one or more of the bonding surfaces can interfere with the bond mechanism between the adherend and adhesive composition, thereby adversely affecting the strength of the final bond. Further, when the amount of activator exceeds about 5 percent by weight of the adhesive composition used, typically little, if any, addition increase in speed of the cure is noted. Generally, an amount of activator equal to between about 0.05 and 1.0 percent by weight of adhesive composition is adequate. Typically, satisfactory results are obtained with a single application of a thin film of activator to the surface or surfaces to be bonded.

When the activator has been applied to the surface and the solvent, if any, has been allowed to subsequently evaporate, the bonding operation can proceed in the normal manner. The adhesive can be applied either to the surface which has been treated with the activator or the appropriate mating surface. Customarily, as with most bonding operations, a thin film of adhesive is most desirable. The two mating surfaces are then placed in abutting relationship, and, preferably, a moderate compressive force is applied to produce a relatively thin layer of adhesive spread substantially evenly between the two surfaces. Typically, a thickness of adhesive between the surfaces in the range of about 0.0254 and 0.127 mm is desirable. However, activators of the present invention may be used to accelerate cure of bonds having bond thicknesses outside this range if desired.

Alternatively, the adhesive can be formulated as a latent two-part adhesive composition in kit form, in which one part is the adhesive formulation containing the free radical source and the second part is the same formulation but with the activator present in place of the free radical source. The two parts are then mixed together just prior to application to one or both surfaces, followed by an immediate joining of the surfaces.

Various modifications and alterations of this invention will become apparent to those skilled in the art without departing from the scope and spirit of this invention, and it should be understood that this invention is not to be unduly limited to the illustrative embodiments set forth herein.

In the examples below, samples were evaluated by the tests described below. These are exemplary of adhesive performance. Different absolute values will be obtained with other adherends and test methods.

A. T-Peel Test

ASTM Standard method of Test for PEEL RESISTANCE OF ADHESIVES (T-PEEL TEST) Designation D1876-72d was used following the recommended procedure with the following modifications.

(1) Adherends were 1010 cold rolled steel sheet 0.81 mm thick cut to a width of 2.5 cm and a length of 20 cm;

(2) Adherends were methylethylketone wiped, Scotch-Brite ™ (3M, St. Paul, Minn.) abraded and acetone wiped;

(3) Adhesive composition was applied as subsequently indicated to about 15 cm×2.5 cm area of the adherends which were then clamped together;

(4) Bonds were allowed to cure for at least 48 hours at 20°–25° C.

B. Overlap Shear Test

ASTM Standard Method of Test for STRENGTH PROPERTIES OF ADHESIVES IN SHEAR BY TENSION LOADING METAL-TO-METAL Designation D1002-72 was used with the following modifications:

The overlap shear strength of the adhesive compositions were measured on test strips of aluminum and steel. The steel strips were prepared as described above with the exception that the strips were 10 cm in length instead of 20 cm. The aluminum test strips consisted of conversion coated 2024 T-3 clad aluminum strips 1.6 mm thick×2.5 cm wide×10 cm long. The chemical conversion coating consisted of: (1) soaking the strips for 10 minutes in an alkaline degreaser (Oakite 164 available from Oakite Products, Inc., Berkeley Heights, N.J. 07922) followed by a 2 minute tap water rinse; (2) immersing the strips for 10 minutes in a chromic acid solution (30 parts de-ionized water, 10 parts 98% sulfuric acid, and 2 parts sodium dichromate) followed by a 2 minute tap water rinse, and 3) baking the strips for 5 minutes at 65° C. The test strips were coated with adhesive by the method described in Example 1.

EXAMPLE 1

In amounts shown in Table I below, adhesive compositions were prepared by hand mixing in Sample Nos. 1, 2, and 3, N-(piperidyl)acrylamide (NAP); Sample Nos. 4 and 5, N-(morpholyl)acrylamide (NAM); Sample Nos. 6 and 7, N-(2,6-dimethylmorpholyl)acrylamide (NADM) with methacrylic acid (MAA), and cumene hydroperoxide (CHPO). The core/shell toughener KM ™ 653 (Rohm & Haas) was added in Sample Nos. 1, 4, 6 and 7; and the core/shell toughener Metablen ™ C223 (M&T Chemical Co.) was added in Sample Nos. 2, 3, and 5 in the amounts shown in parts by weight in TABLE I. The tougheners used were comprised of a crosslinked butadiene-styrene rubber core and a glassy poly(methylmethacrylate) shell.

TABLE I

| | Adhesive Composition | | | | | | |
|---|---|---|---|---|---|---|---|
| Sample | NAP | NAM | NADM | MAA | CHPO | C223 | KM653 |
| 1 | 65 | — | — | 10 | 0.5 | — | 25 |
| 2 | 60 | — | — | 10 | 1.0 | 30 | — |
| 3 | 50 | — | — | 10 | 1.0 | 40 | — |
| 4 | — | 65 | — | 10 | 0.5 | — | 25 |
| 5 | — | 70 | — | 10 | 1.0 | 30 | — |
| 6 | — | — | 65 | 10 | 0.5 | — | 25 |
| 7 | — | — | 50 | 10 | 0.5 | — | 40 |

The adhesive composition was coated in a 75 micometers thick layer onto 1.5 cm of one end of a cleaned strip and about a 2 micrometers thick layer of primer disclosed in Assignee's copending application, No. 07/297,886, filed the same date as this application was coated onto 1.5 cm of one end of a second cleaned strip. The two strips were then assembled together so that the coated areas were in contact and the bonds formed allowed to cure at about 20° C. for two days. T-Peel strength and Overlap Shear strength were then measured for each construction. The data obtained is shown in Table II.

TABLE II

| Ad-hesive | Overlap shear strength (MPa) | | | | T-Peel strength (N/25 mm) | |
|---|---|---|---|---|---|---|
| No. | −40° C. | 20° C. | 82° C. | 121° C. | −40° C. | 20° C. |
| 1 | nt$^{(c)}$ | 16.5 | 12.0 | 10.2 | 4.5 | 93 |

TABLE II-continued

| Adhesive No. | Overlap shear strength (MPa) | | | | T-Peel strength (N/25 mm) | |
|---|---|---|---|---|---|---|
| | −40° C. | 20° C. | 82° C. | 121° C. | −40° C. | 20° C. |
| 2 | 17.3 | 17.9 | 11.3 | 10.6 | 4.5 | 142 |
| 3 | 19.0 | 15.7 | 8.1 | 7.9 | 4.5 | 196 |
| 4 | nt | 16.2 | 13.4 | 7.7 | 9.0 | 187 |
| 5 | nt | 15.7 | 14.6 | nt | 4.5 | 111–222 |
| 6 | nt | 14.3 | 8.6 | nt | nt | 31 |
| 7 | nt | 13.6 | nt | nt | nt | nt |
| 8[a] | nt | 15.8 | 10.6 | nt | 4.5 | 165 |
| 9[b] | 9.0 | 15.2 | 10.4 | nt | 89 | 160 |

[a]Comparative composition (low odor methacrylate) comprising a copolymer of 40 parts tetrahydrofurfuryl methacrylate: 10 parts hydroxyethyl methacrylates: 10 parts methacrylic acid: 40 parts Metablen ™ C223 toughener
[b]Comparative composition using Konishi ™ AG1, a high odor structural adhesive system composed of both primer and adhesive (by Konishi, Osaka, Japan)
[c]Not tested The adhesive compositions, Sample Nos. 1–7 were of low odor while comparative Sample No. 8 was more odorous than Samples 1–7 and Sample No. 9 was highly odorous because of its lower alkyl ester methacrylate content. It is seen from Table II, that the adhesive compositions of the invention provide good low and elevated temperature overlap shear strength and good 20° C. T-Peel strength.

EXAMPLE 2

Adhesive compositions of the invention, Sample Nos. 2, 3, 4 and 7 of Example 1 and comparative compositions Sample Nos. 8 and 9 of Example 1, were coated onto steel strips, assembled together, and the adhesive cured as described in Example 1. After each cured assembly was immersed in water at 50° C. for one week, the Overlap Shear strengths were measured. The results are recorded in Table III. The same compositions evaluated above were coated onto etched 2024 T3 clad aluminum strips (1.6 mm thick, 2.5 cm × 10.0 cm) and cured as described in Example 1. After each cured assembly was immersed in water at 50° C. for one week, the Overlap Shear strengths were then measured. The results are recorded in Table III.

TABLE III

| Adhesive no. | Initial 20° C. overlap shear (MPa) | Overlap shear (MPa) after 1 week in water at 50° C. | % Change |
|---|---|---|---|
| on steel | | | |
| 2 | 17.9 | 15.3 | −14 |
| 3 | 15.7 | 15.7 | 0 |
| 4 | 16.2 | 0 | −100 |
| 7 | 13.6 | 0 | −100 |
| 8[a] | 15.8 | 13.0 | −17 |
| 9[b] | 20.1 | 16.8 | −17 |
| On Aluminum | | | |
| 2 | 15.6 | 15.6 | 0 |
| 3 | 15.7 | 15.3 | −2 |
| 4 | 14.1 | 0.8 | −95 |
| 7 | 10.3 | 9.4 | −9 |
| 9[b] | 30.5 | 30.1 | −1 |

(a)&(b) are as defined in TABLE II.

From TABLE III it can be observed that adhesive compositions of Sample Nos. 2 and 3 of the invention comprising N-(piperidyl)acrylamide maintained excellent overlap shear strength after one week in water at 50° C. when used to adhere both steel and aluminum strips as did the adhesive of Sample No. 7, comprising N-(2,6-dimethylmorpholyl)acrylamide, on aluminum.

EXAMPLE 3

Adhesive compositions of the invention, Sample Nos. 1, 2, 3 and 4 and comparative compositions of Sample Nos. 9, 10, 11 were coated onto "as-received" (i.e., not cleaned) plastic strips in place of steel strips which were assembled, and cured as described in Example 1. The Overlap Shear strength was measured on each construction and the results recorded in Table IV.

TABLE IV

| Adhesive No. | Overlap Shear (MPa) | | | | |
|---|---|---|---|---|---|
| | ABS[d] | PVC[e] | PS[f] | LEX[g] | FRP[h] |
| 1 | 6.2* | 4.7* | 5.0* | 5.4* | 4.1* |
| 2 | 3.2 | 5.8 | 3.3 | 3.9 | 3.5 |
| 3 | 2.5 | 4.3 | 3.4 | 2.9 | 3.5 |
| 4 | 5.3 | 2.6 | 3.7 | 2.7 | 3.4 |
| 9[a] | 2.2 | 2.3 | nt[i] | nt | 3.3 |
| 10[b] | 6.8* | 4.6* | nt | nt | 2.2 |
| 11[c] | 4.7 | 3.8* | nt | nt | 3.3 |

[a]comparative composition: using Konishi AG1, a structural adhesive system (by konshi, Japan)
[b]comparative composition: using Konishi AG2, a structural adhesive system (Konshi, JApan)
[c]composition: using Konishi AG3, structural adhesive system (Konshi, Japan)
[d]poly(acrylonitrile: butadiene: styrene)
[e]poly(vinylchloride)
[f]polystyrene
[g]Lexan ™ (a polycarbonate from Bisphenol A and Phosgene)
[h]fiber reinforced plastic (from unsaturated polyester, styrene and fiberglass)
[i]not tested
*substrate failed during test It can be seen in Table IV that the adhesive compositions of the invention provide excellent bonds on a variety of plastic substrates.

Various modifications and alterations of this invention will become apparent to those skilled in the art without departing from the scope and spirit of this invention, and it should be understood that this invention is not to be unduly limited to the illustrative embodiments set forth herein.

We claim:

1. A low odor adhesive composition comprising:
   (a) at least one acrylamido compound selected from the group consisting of N-substituted acrylamides and methacrylamides that have a cyclic group directly attached to the amide nitrogen and acrylamides and methacrylamides in which the amide nitrogen is a member of a cyclic group;
   (b) at least one ethylenically-unsaturated acid that is copolymerizable with said acrylamido compound;
   (c) an effective amount of polymeric toughener; and
   (d) an effective amount of at least one of an initiator and an activator.

2. The adhesive composition according to claim 1 wherein said polymeric toughener comprises at least one of:
   (a) core/shell materials, and
   (b) elastomeric polymers that have a $T_g$ of 30° C. or lower and that are dispersible in said acrylamido compound.

3. The adhesive composition according to claim 1 wherein said polymeric toughener is present in an amount in the range of 0.1 to 1.25 parts by weight per part of acrylamido compound.

4. The adhesive composition according to claim 1 wherein said polymeric toughener is present in an amount in the range of 0.2 to 0.5 parts by weight per part of acrylamido compound.

5. The adhesive composition according to claim 1 wherein said polymeric toughener comprises elastomeric polymers that have a $T_g$ of 30° C. or lower and that are soluble and reactive in said acrylamido compound.

6. The adhesive composition according to claim 5 wherein said polymeric toughener is present in an amount in the range of 0.1 to 1.25 parts by weight per part of acrylamido compound.

7. The adhesive composition according to claim 5 wherein said polymeric toughener is present in an amount in the range of 0.2 to 0.5 parts by weight per part of acrylamido compound.

8. The adhesive composition according to claim 1 wherein said ethylenically-unsaturated acid is present in an amount in the range of 0.01 to 1.25 parts by weight per part of acrylamido compound.

9. The adhesive composition according to claim 1 wherein said ethylenically-unsaturated acid is present in an amount in the range of 0.1 to 0.2 parts by weight per part of acrylamido compound.

10. The composition of claim 1 wherein said acrylamido compound has the formula

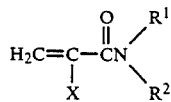

wherein
X is hydrogen, methyl, or halogen;
$R^1$ is a mono or polycyclic monovalent group, the cyclic groups of which are selected from (a) aromatic carbocyclic and heterocyclic N, O, S, P and Si-containing groups having 5 to 18 atoms in the cyclic group and (b) saturated and unsaturated aliphatic carbocyclic and heterocyclic N, O, S, P, and Si-containing groups having 4 or 18 atoms in the cyclic group, $R^1$ being optionally substituted by groups selected from lower alkyl groups of 1 to 4 carbon atoms, hydroxyl, acyloxy, alkoxy of 1 to 4 carbon atoms, cyano, halo, phenyl, and benzo groups;
$R^2$ is selected from $R^1$, hydrogen, or lower alkyl groups having 1 to 4 carbon atoms; or $R^2$ together with $R^1$ is a divalent group, $R^3$, which together with the nitrogen to which it is attached forms a heterocyclic group having 5 to 6 atoms in the ring that may be substituted by lower alkyl groups of 1 to 4 carbon atoms, hydroxyl, halo, or phenyl group or by a divalent group that forms a di- or tricyclic group, with the proviso that when X is methyl, $R^2$ is hydrogen.

11. The composition of claim 1 wherein the acrylamides are selected from the group consisting of N-(piperidyl)acrylamide, N-(morpholyl)acrylamide, N-(2,6-dimethylmorpholyl)acrylamide, N-(pyrrolidyl)acrylamide, and N-cyclohexyl-N-methylacrylamide.

12. The composition of claim 1 containing 0.1 to 0.2 parts by weight of at least one ethylenically-unsaturated acid and 0.2 to 0.5 parts by weight of a polymeric toughener per part of acrylamido compound.

13. The composition of claim 1 wherein the ethylenically-unsaturated acids are selected from the group consisting of ethylenically-unsaturated carboxylic acids and ethylenically-unsaturated acids of phosphorus.

14. A process of bonding two or more substrates comprising the steps:
(a) applying to at least one of said substrates a coating comprising an adhesive composition comprising a mixture of:
  (1) at least one acrylamido compound selected from the group consisting of N-substituted acrylamides and methacrylamides that have a cyclic group directly attached to the amide nitrogen and acrylamides and methacrylamides in which the amide nitrogen is a member of a cyclic group;
  (2) at least one ethylenically-unsaturated acid that is copolymerizable with said acrylamido compound;
  (3) an effective amount of polymeric toughener; and
  (4) an effective amount of a free radical initiator; and
(b) applying to at least one of said substrates a coating comprising an activator composition;
(c) placing said coated substrates in an abutting relationship so as to form contact between said coatings, optionally under compressive pressure, until said adhesive composition polymerizes thereby bonding said substrates together.

15. A process of bonding two substrates comprising:
(a) applying to at least one of said substrates a coating comprising an adhesive composition comprising a mixture of
  (1) at least one acrylamino compound selected from the group consisting of N-substituted acrylamides and methacrylamides that have a cyclic group directly attached to the amine nitrogen and acrylamines and methacrylamides in which the amide nitrogen is a member of a cyclic group;
  (2) at least one ethylenically-unsaturated acid that is copolymerizable with said acrylamino compound;
  (3) an effective amount of polymeric toughener; and
  (4) an effective amount of a free radical initiator; and
(b) applying to at least one of said substrates a coating comprising an activator composition which comprises the condensation product of an alpha-hydroxy ketone and a primary amine;
(c) placing said coated substrates in an abutting relationship so as to form contact between said coatings under compressive pressure until said adhesive composition polymerizes thereby bonding said substrates together.

16. The process of bonding two substrates together according to claim 14 wherein said activator is applied, dissolved, or suspended in a solvent, which solvent is subsequently evaporated leaving a layer of said activator on said surface.

17. The process according to claim 15 wherein said activator composition further comprises a transition metal salt and a solvent.

18. A laminated structure comprising two or more substrates bonded together by the composition of claim 1.

19. A kit for preparing a latently curable adhesive composition having component parts capable of being mixed when the composition is to be applied, said kit comprising:
in one part an adhesive composition comprising:
  (a) at least one acrylamido compound selected from the group consisting of N-substituted acrylamides and methacrylamides that have a cyclic group directly attached to the amide nitrogen and acrylamides and methacrylamides in which the amide nitrogen is a member of a cyclic group;
  (b) at least one ethylenically-unsaturated acid that is copolymerizable with said acrylamido compound;
  (c) an effective amount of polymeric toughener; and
  (d) an effective amount of an initiator; and in a second part an adhesive composition comprising:

(a) at least one acrylamido compound selected from the group consisting of N-substituted acrylamides and methacrylamides that have a cyclic group directly attached to the amide nitrogen and acrylamides and methacrylamides in which the amide nitrogen is a member of a cyclic group;

(b) at least one ethylenically-unsaturated acid that is copolymerizable with said acrylamido compound;

(c) an effective amount of polymeric toughener; and (d) an effective amount of an activator.

20. The adhesive composition according to claim 1 wherein said activator is the condensation product of an alpha-hydroxy ketone and a primary amine in combination with s salt containing one or more transition metals selected from the group consisting of vanadium, molybdenum, cobalt, iron, and copper.

* * * * *

UNITED STATES PATENT AND TRADEMARK OFFICE
CERTIFICATE OF CORRECTION

PATENT NO. : 4,945,006

DATED : July 31, 1990

INVENTOR(S) : John M. Muggee et al.

It is certified that error appears in the above-identified patent and that said Letters Patent is hereby corrected as shown below:

Col. 12, line 25, kindly delete "amine" and insert therefor -- amide --.

Col. 14, line 6, "s salt" should read -- a salt --.

Signed and Sealed this

Seventeenth Day of November, 1992

*Attest:*

DOUGLAS B. COMER

*Attesting Officer*     *Acting Commissioner of Patents and Trademarks*